Jan. 7, 1941. G. W. BIRD 2,228,046
BABY CARRIAGE
Filed April 30, 1940 2 Sheets-Sheet 1
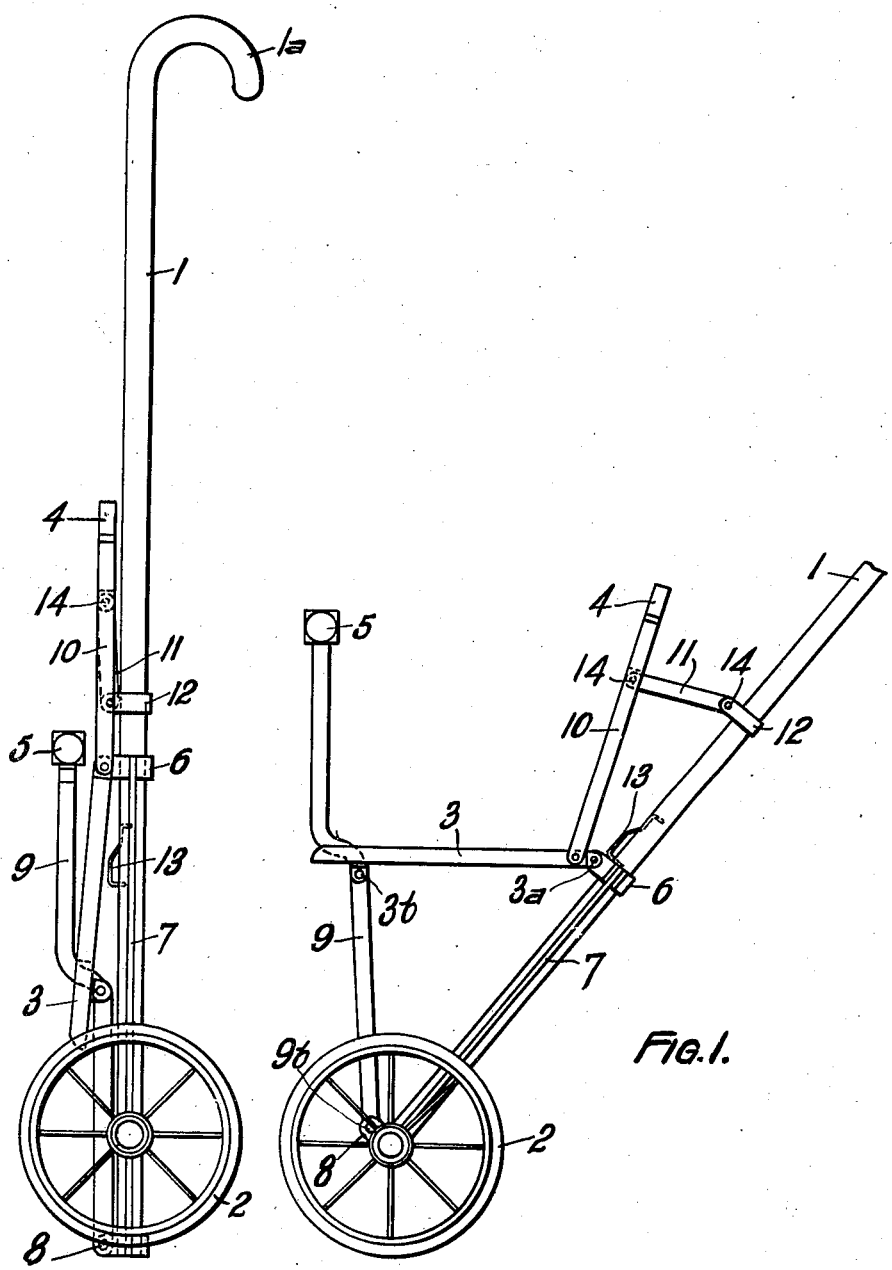

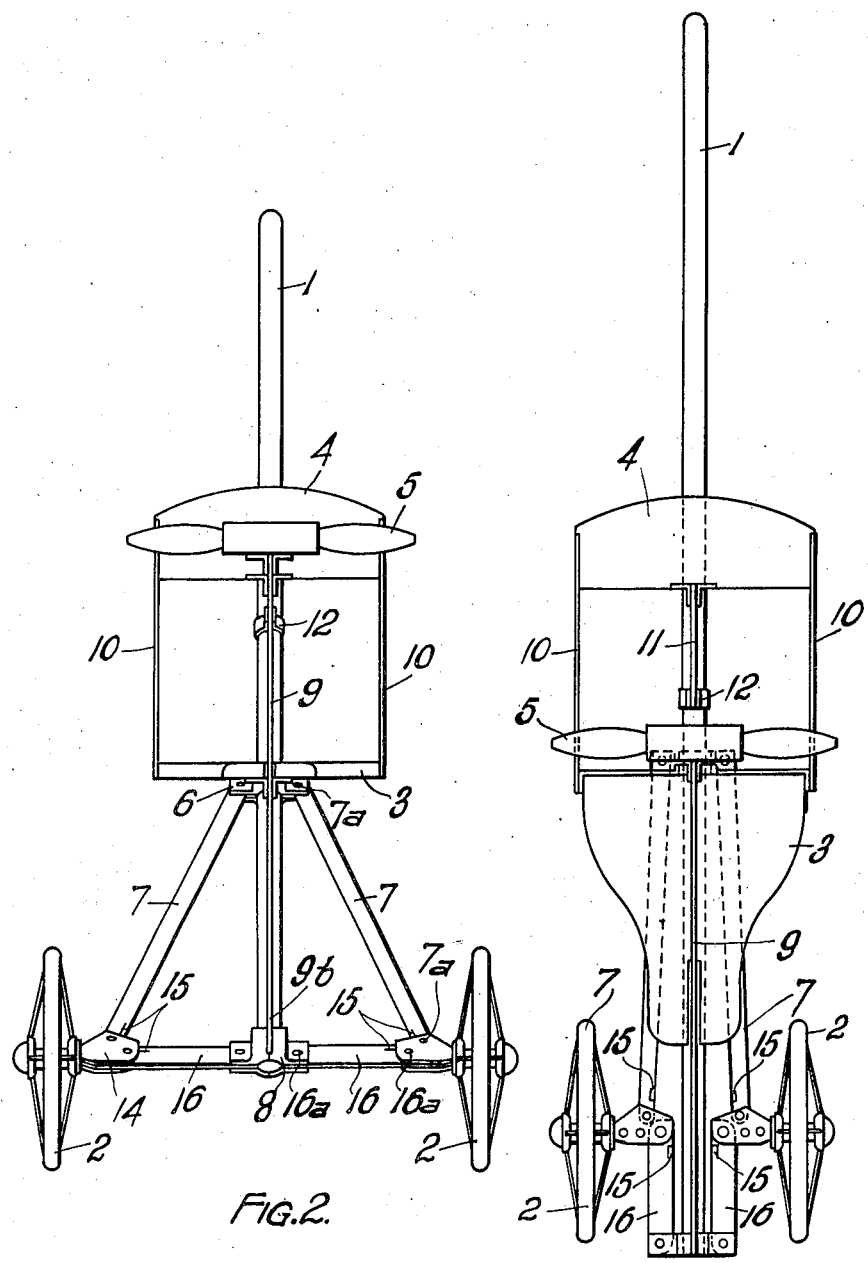

Patented Jan. 7, 1941

2,228,046

UNITED STATES PATENT OFFICE 2,228,046

BABY CARRIAGE

Geoffrey Wallace Bird, Iver, England

Application April 30, 1940, Serial No. 332,448
In Great Britain October 17, 1938

4 Claims. (Cl. 280—41)

This invention relates to baby carriages or push chairs of the folding or collapsible type.

The invention has for its object to provide an improved apparatus of the aforesaid kind and mainly consists in the improved construction and arrangement as hereinafter described whereby the portability is increased and the method of folding reduced to a single motion or operation, that is to say whereby the wheels, axles, seat and backrest are interconnected by limbs or other members and may be folded or collapsed to and from a position adjacent and substantially parallel to the longitudinal axis of the main support or backbone.

According to the invention the baby carriage or push chair comprises in combination a single main support or backbone, saddle or seat, handlebar, folding axles and wheels, the aforesaid parts being so arranged and adapted that they may be moved simultaneously to and from a position directly adjacent and substantially parallel with the longitudinal axis of the main support or backbone, and no part of the said device or parts carried thereby when the device is collapsed projects or project beyond the said main support or backbone a distance substantially greater than the radius of the said wheel or wheels.

In the preferred embodiment of the invention the wheels are rotatably and hingedly mounted on radially disposed arms which are hinged or pivoted at their other ends whereby said arms can be moved from a position substantially at right angles to the main support or backbone to a position in which they lie flat against opposite sides of and substantially parallel to the longitudinal axis of said main support or backbone.

In order that the invention may be more clearly understood one particular embodiment thereof will now be described by way of example with reference to the accompanying drawings in which:

Figure 1 is a side elevation of a baby carriage or push chair constructed in accordance with this invention and in the "open" or mobile position, Figure 2 is a front elevation thereof in its "open" or mobile position, Figure 3 is a front elevation of the baby carriage or push chair in its "closed" or portable position, showing the arrangement of parts when folded or collapsed, and Figure 4 is a side elevation of the device in its "closed" or portable position.

Referring to these drawings the baby carriage or push chair comprises a folding or collapsible mobile seat having a single main support or backbone 1, a grip or handle 1a at one end, folding axles or members 16 hinged or pivoted on opposite sides of a lug 8 and situate at the end of the support 1 farthest from the said handle or grip 1a. A slidably mounted lug 6 is free to move along the support 1 between the said grip or handle 1a and the folding axles 16.

A seat or saddle 3 is hinged or pivoted at 3a to the said slidably mounted lug 6 and is free to move to and from a position in which the underside of the said seat or saddle 3 is substantially parallel to and immediately adjacent to the aforesaid backbone or support 1.

Wheels 2 are rotatably mounted on spindles or lugs 14 hingably secured to the free ends of the said folding axles 16 by hinge pins 16a.

These spindles or lugs 14 are in turn hingably connected to the slidably mounted lug 6 by limbs or members 7 and hinge pins 7a.

The members 7 and axles 16 are provided with stops 15 or similar device or devices to limit the movement or travel of the wheels 2 from a position when the axles 16 are at right angles to the longitudinal axis of the support 1 and as shown in Figure 2 to a position when the said axles 16 are substantially parallel to the said axis and lie flat against the side of the support 1 and as shown in Figure 3.

A further limb or member 9 is hingably mounted on the lug 8 by means of a pin or similar device 9b at one end and is hingably secured at a point 3b near the free end of the saddle or seat 3 and carries a handle or handlebar 5 at its other end.

The distance equal to the sum of the length of the seat 3 measured from the hinge pin 3a to the hinge pin 3b plus the length of the member 9 measured from the hinge pin 3b to the hinge pin 9a must be substantially equal to the sum of the lengths of one member 7 and one axle 16 measured from centre to centre of their respective hinge pins 7a and 16a, so that the seat 3 and the wheels 2 are free to take up a position immediately adjacent to the main support 1 and as shown in Figures 3 and 4, when the slidably mounted lug 6 is moved along the support 1 in the direction of the handle or grip 1a.

Limbs or members 10 support a backrest 4 and are hingably secured on opposite sides of the seat or saddle 3. An arm or member 11 hingably fastened to the support 1 by a clip or lug 12 and to the backrest 4 is made of length sufficient to move the backrest 4 to and from a position substantially parallel to the longitudinal axis of the support 1 and as shown in Figure 4 to a position when the backrest 4 is conveniently placed for a child or infant seated astride the saddle or seat 3 and as shown in Figure 1 when the slidably mounted lug 6 is moved along the support 1 in the direction of the grip 1a.

A depressible spring latch 13 or similar device secures or releases at will the slidably mounted lug 6 and holds the baby carriage or push chair rigid in its "open" position as shown in Figure 1 or allows it to be folded as shown in Figure 4.

A baby carriage or push chair constructed in accordance with this invention permits of the greatest practicable portability and the space saved when the device is in its folded or collapsed position over other devices of this type is very substantial. For instance, in apparatus of the ordinary folding or collapsible type designed to carry a child or infant, the wheel track or transverse measurement between the wheels on opposite sides is in no way diminished or made smaller by the action of folding the device, and would normally be from fifteen to eighteen inches and in many cases would be considerably greater, whereas in an apparatus according to this invention the overall width in any direction can be readily reduced to as little as seven inches or even less and this saving in overall size is very important where travel on public vehicles of all descriptions is concerned or space is restricted as for example inside an automobile.

It is of course evident that the main support or backbone of the apparatus can be fitted with a variety of handles other than the more common type of grip as for example a shooting stick seat handle. This would permit the device to be used as a seat for an adult person when it is in its folded position.

If desired a stay or like member (not shown) may be hingedly mounted on the device, for example on the rear side of the lug 6, in such a manner as to lie, normally, in a position closely adjacent and parallel with the main support 1, but capable of being swung into a position in which it extends outwardly and rearwardly to act as a prop for supporting the devise in the position shown in Figure 1, and thus renders the device self-supporting.

What I claim and desire to secure by Letters Patent is:

1. A baby carriage embodying therein a main support, wheel spindles, wheels thereon, axles pivotally connected at their adjacent inner ends to said support and at their respective outer ends to said wheel spindles, a lug slidably mounted on said support, members each having one end pivotally connected with said lug and the other end pivotally connected with a wheel spindle, a seat pivotally connected with said lug, and a member pivotally connected with said support adjacent said axles and with the free end of said seat, whereby relative movement of said lug and said support will cause pivotal movement of said axles and bring said axles and said wheels adjacent said support, and move the members extending between said lug and said spindles and between said seat and said support, and the seat, to adjacent said support.

2. A baby carriage embodying therein a main support, wheel spindles, wheels thereon, axles pivotally connected at their adjacent inner ends to said support and at their respective outer ends to said wheel spindles, a lug slidably mounted on said support, members each having one end pivotally connected with said lug and the other end pivotally connected with a wheel spindle, a seat pivotally connected with said lug, a member pivotally connected with said support adjacent said axles and with the free end of said seat, whereby relative movement of said lug and said support will cause pivotal movement of said axles and bring said axles and said wheels adjacent said support, and move the members extending between said lug and said spindles and between said seat and said support, and the seat, to adjacent said support, and a handlebar carried by said last named member forwardly of said seat.

3. A baby carriage embodying therein a main support, wheel spindles, wheels thereon, axles pivotally connected at their adjacent inner ends to said support and at their respective outer ends to said wheel spindles, a lug slidably mounted on said support, members each having one end pivotally connected with said lug and the other end pivotally connected with a wheel spindle, a seat pivotally connected with said lug, a backrest pivotally connected with said seat, a clip carried by said support, members pivotally connected with said backrest and said clip, and a member pivotally connected with said support adjacent said axles and with the free end of said seat, whereby relative movement of said lug and said support will cause pivotal movement of said axles and bring said axles and said wheels adjacent said support, and move the members extending between said lug and said spindles and between said seat and said support, and the seat, to adjacent said support.

4. A baby carriage embodying therein a main support, wheel spindles, wheels thereon, axles pivotally connected at their adjacent inner ends to said support and at their respective outer ends to said wheel spindles, a lug slidably mounted on said support, releasable means whereby relative movement of said lug and said support may be prevented when the carriage is extended, and permitted to allow collapsing of said carriage, members each having one end pivotally connected with said lug and the other end pivotally connected with a wheel spindle, a seat pivotally connected with said lug, and a member pivotally connected with said support adjacent said axles and with the free end of said seat, whereby relative movement of said lug and said support will cause pivotal movement of said axles and bring said axles and said wheels adjacent said support, and move the members extending between said lug and said spindles and between said seat and said support, and the seat, to adjacent said support.

GEOFFREY WALLACE BIRD.